United States Patent
Rey

(10) Patent No.: US 7,115,201 B2
(45) Date of Patent: *Oct. 3, 2006

(54) METHOD OF TREATING MINE DRAINAGE

(75) Inventor: Paul Rey, Pittsburgh, PA (US)

(73) Assignee: Kroff Chemical Company, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/074,023

(22) Filed: Mar. 7, 2005

(65) Prior Publication Data

US 2005/0145574 A1 Jul. 7, 2005

Related U.S. Application Data

(63) Continuation of application No. 10/335,081, filed on Dec. 31, 2002, now Pat. No. 6,932,909.

(60) Provisional application No. 60/348,642, filed on Jan. 15, 2002.

(51) Int. Cl.
*C02F 1/56* (2006.01)

(52) U.S. Cl. .................. 210/698; 210/699; 210/700; 210/701; 210/721; 210/725; 210/727; 210/759; 210/912; 210/916; 422/5

(58) Field of Classification Search ........ 210/696–701, 210/718, 721, 727, 734, 735, 736, 754, 756, 210/758–760, 912, 916, 919; 422/5
See application file for complete search history.

(56) References Cited

U.S. PATENT DOCUMENTS

| | | | |
|---|---|---|---|
| 3,142,639 A | | 7/1964 | Baer et al. |
| 3,511,777 A | * | 5/1970 | Spinola ................. 210/710 |
| 4,465,597 A | | 8/1984 | Herman et al. |
| 4,640,793 A | * | 2/1987 | Persinski et al. ........... 252/180 |
| 4,695,378 A | | 9/1987 | Ackman et al. |
| 5,035,808 A | | 7/1991 | Hassick et al. |
| 5,124,046 A | * | 6/1992 | Sherwood et al. .......... 210/699 |
| 5,160,632 A | * | 11/1992 | Kleefisch et al. ........... 210/724 |
| 5,259,974 A | | 11/1993 | Chen et al. |
| 5,358,642 A | | 10/1994 | Chen et al. |
| 5,370,800 A | * | 12/1994 | Stevenson ................ 210/710 |
| 5,427,691 A | * | 6/1995 | Kuyucak et al. ............ 210/713 |
| 5,505,857 A | * | 4/1996 | Misra et al. ................ 210/709 |
| 5,645,730 A | | 7/1997 | Malachosky et al. |
| 5,698,107 A | | 12/1997 | Wurzburger et al. |
| 5,871,648 A | * | 2/1999 | Allen et al. ................ 210/638 |
| 5,954,969 A | | 9/1999 | Hedin |
| 6,063,290 A | * | 5/2000 | Failon et al. .............. 210/699 |
| 6,139,753 A | * | 10/2000 | Taylor ...................... 210/717 |
| 6,184,257 B1 | | 2/2001 | Hassick |
| 6,254,782 B1 | * | 7/2001 | Kreisler .................... 210/710 |

FOREIGN PATENT DOCUMENTS

WO    WO 94/18126 A1    8/1994

OTHER PUBLICATIONS

Skousen and Ziemkiewicz, *Acid Mine Drainage Control and Treatment*, 1996, pp. 151-248, Second Edition, West Virginia University and the National Mine Land Reclamation Center, Morgantown, WV.
McCoy, *The Chemical Treatment of Cooling Water*, 1974, pp. 22, 23, 30, 31, 38, 39, 44-49, 56-59, 64, 65, 68-71, and 180-183, Chemical Publishing Company, New York, NY.
Mochida Hiromi et al., JP 10 75093 English language abstract, Mar. 20, 1989.
Tamanoi Masatoshi, JP 60 248293 English language abstract, Dec. 7, 1985.
Oda Motoki et al., JP 60 090832 English language abstract, May 22, 1985.
Morimoto Akemi, JP 59 010391 English language abstract, Jan. 19, 1984.
Hayashi Yukio et al., JP 55 061996 English language abstract, May 10, 1980.
NALCO® 7801 Scale Control Chemical, Mining Chemicals Product Bulletin, Nalco Chemical Co., Naperville, Illinois 1989.
NALCO® 7805 Scale Control Chemical, Mining Chemicals Product Bulletin, Nalco Chemical Co., Naperville, Illinois 1985.
ENDUR™ 7816 Scale Control Program, Mining Chemicals Product Bulletin, Nalco Chemical Co., Naperville, Illinois—1987.
ENDUR™ 7817 Scale Control Program, Mining Chemicals Product Bulletin, Nalco Chemicals Product Bulletin, Nalco Chemical Co., Naperville, Illinois—1987.
NALCO® 7819 Coal Preparation Plant Water Stabilization Agent, Mining Chemicals Product Bulletin, Nalco Chemical Co., Naperville, Illinois—1986.
NALCO® 7819 Coal Preparation Plant Water Stabilization Agent, Mining Chemicals Product Bulletin, Nalco Chemical Co., Naperville, Illinois—1986.
Brian K. Failon, "Scale Detection and Control During Mineral Beneficiation", Presented at the American Institute of Mining Engineers Annual Meeting, 1987.
American Cyanamid Company, Mining Chemical Handbook, pp. 132-133, Copyright 1986.
CYQUEST® 3223, Material Safety Data Sheet 0000602, Feb. 19, 2003, Cytec Canada, Inc.
Clarke et al., "Use of DEQUEST® Deflocculant-Sequestrants as Scale-Preventative Agents In Water Treatment: A Phenomenological Study" Special Report No. 7396, Monsanto Company, Revised: May 20, 1969.

* cited by examiner

*Primary Examiner*—Peter A. Hruskoci
(74) *Attorney, Agent, or Firm*—The Webb Law Firm

(57) ABSTRACT

A method of treating mine drainage water including the step of adding a scale control agent to the mine drainage water and, optionally, adding an oxidizing agent to the mine drainage water and/or precipitating and settling the metals in their hydroxide form from the water. The treated water may be safely returned to the environment.

25 Claims, No Drawings

METHOD OF TREATING MINE DRAINAGE

CROSS REFERENCE TO RELATED APPLICATIONS

This application is a continuation of U.S. application Ser. No. 10/335,081, filed Dec. 31, 2002 now U.S. Pat. No. 6,932,909 and entitled "Method of Treating Mine Drainage", which claims priority from U.S. Provisional Patent Application No. 60/348,642 filed Jan. 15, 2002 and entitled "Method of Treating Mine Drainage".

BACKGROUND OF THE INVENTION

1. Field of the Invention

This invention relates to methods of treating waste and drainage waters comprising metal and/or metalloid ions, such as ions selected from, but not limited to, iron, copper, zinc, lead, mercury, cadmium, arsenic, barium, selenium, silver, chromium, aluminum, manganese, nickel, cobalt, uranium, and antimony. More specifically, the present invention relates to a method of treating drainage waters with high hardness and alkalinity, as well as metals and/or metalloid ions, emanating from active, inactive or abandoned mine or construction sites.

2. Description of Related Art

Acid mine drainage (AMD) is polluted water that normally contains high levels of dissolved solids such as iron, manganese, aluminum, and sulfuric acid. The contaminated water is often an orange or yellowish-orange color, indicating high levels of iron. AMD comes from pyrite or iron sulfide, a mineral associated with coal. When pyrite is disturbed, as it is during coal mining, it weathers and reacts with oxygen and water to produce sulfuric acid. Metals are dissolved in the acidic environment and, consequently, high levels of iron, aluminum, and sulfate are generally observed.

Significant quantities of AMD are associated with many former and current mining operations. The problems caused by AMD include: (a) toxicity arising from particular metal contaminants, environmental pollution where the waters containing such metals are allowed to flow to areas producing contamination with toxic elements being labile or only loosely bound by adsorption; (b) the corrosive effects arising from the acidic pH values from sulfide oxidation to sulfuric acid; and (c) the lost opportunity for using the water for irrigation or human purposes.

A wide variety of methods have been proposed for remediating AMD. For example, In-situ mitigation is a method whereby limestone placements are put down to collect surface run-off and funnel it into waste rock dumps. Acidic material is capped with an impermeable layer to divert water from the acid cores. This method relies on the existence of sufficient rainfall to produce seepage or drainage that continually contacts the limestone. The method has limited efficiency for remediation and is weather dependent.

Wetlands based treatment has also been considered. This method uses a man-made wetland ecosystem to remove heavy metals. The efficiency of this method is typically less than that observed with chemical precipitation processes.

Since the passage of the Surface Mining Control and Reclamation Act (SMCRA) in 1977, coal mine operators have been required to meet environmental land reclamation performance standards established by federal and state regulatory programs. Operators must also meet water quality standards established in the Clean Water Act of 1972 (CWA), which regulates discharges into waters of the United States. Control of AMD is a requirement imposed on operators by both SMCRA and CWA. In addition to the surface mining permit, each mining operation must be issued a National Pollutant Discharge Elimination System (NPDES) permit under CWA. Allowable pollutant discharge levels are usually determined by the United States Environmental Protection Agency's (EPA) technology-based standards, or the discharge levels may be based on the more stringent water quality-based standards where discharges are being released into streams with designated uses. If AMD problems develop during mining or after reclamation, a plan to treat the discharge must be developed. Treatment of AMD includes neutralization of acidity and precipitation of metal ions to meet the relevant effluent limits.

Additionally, states have begun to regulate mine drainage. For example, in West Virginia, W. Va. Code, § 22-3-13(b)(10) provides that surface miners are required at a minimum to avoid acid or other toxic mine drainage by such measures as (i) preventing or removing water from contact with toxic producing deposits; (ii) treating drainage to reduce toxic content which adversely affects downstream water upon being released to water courses; and (iii) casing, sealing, or otherwise managing boreholes, shafts, and wells, and keeping acid or other toxic drainage from entering ground and surface waters.

In the precipitation process, enough alkalinity must be added to raise water pH so dissolved metals in the water will form insoluble metal hydroxides and settle out of the water. The pH required to precipitate most metals from water ranges from pH 6 to 9 (except ferric iron, which precipitates at about pH 3.5). The types and amounts of metals in the water, therefore, heavily influence the selection of an AMD treatment system. Ferrous iron converts to a solid bluish-green ferrous hydroxide at a pH greater than 8.5. In the presence of oxygen, ferrous iron oxidizes to ferric iron, and ferric hydroxide forms a yellowish-orange solid (commonly called yellow boy), which precipitates at a pH greater than 3.5. In oxygen-poor AMD where iron is primarily in the ferrous form, enough alkalinity must be added to raise the solution pH to 8.5 before ferrous hydroxide precipitates. In general, higher pH, especially in the range of pH 8–10, accelerates the development of the hydroxide precipitant.

A more efficient way of treating high ferrous AMD is to aerate the water in conjunction with adding a neutralizing chemical to raise the pH to between 7.5 and 8.5, causing the iron to convert from ferrous to ferric, and then to form ferric hydroxide. Aeration of the process water before and after treatment usually reduces the amount of neutralizing reagent necessary to precipitate iron from AMD. Aluminum (Al) hydroxide generally precipitates at a pH greater than 5 but also enters solution again at a pH of 9. Manganese (Mn) precipitation is variable due to its many oxidation states, but will generally precipitate at a pH of 9 to 10. Sometimes, however, a pH of 10.5 is necessary for complete removal of manganese. Interactions among metals also influence the rate and degree to which metals precipitate. For example, iron precipitation will largely remove manganese from the water at pH 8 due to co-precipitation, but only if the iron concentration in the water is much greater than the manganese content (about 4 times more or greater). If the iron concentration in the AMD is less than four times the manganese content, manganese may not be removed by co-precipitation, and a solution pH of greater than 9 is necessary to remove the manganese.

Aeration is the process of introducing air into water. Oxidation occurs when oxygen in air combines with metals in the water. If the water is oxygenated, metals generally will precipitate at lower pH values. For this reason, aeration of water can be a limiting factor in many water treatment systems. If aeration and oxidation were incorporated or improved in the treatment system, chemical treatment efficiency would increase, and costs could be reduced. Oxidants are sometimes used to aid in the completion of the oxidation process to enhance metal hydroxide precipitation and reduce metal floc volume. Chemical oxidants such as hypochlorite, hydrogen peroxide, calcium peroxide, and potassium permanganate can be used to treat mine drainage and are demonstrated effective oxidation agents.

Flocculants, inorganic coagulants, and/or organic coagulants may be used to treat AMD. They tend to increase particle settling efficiency. Coagulants reduce the net electrical repulsive forces at particle surfaces, thereby promoting consolidation of small particles into larger particles. Also, inorganic coagulants provide additional solids for enhanced particle/particle contact. The most common inorganic coagulants used in water treatment are aluminum sulfate (alum), aluminum chloride, polyaluminum chloride (PAC), aluminum chlorohydrate, ferric chloride, and ferric sulfate. The most common organic coagulants are homopolymers of diallyl dimethyl ammonium chloride, polyamines, and quaternized polyepichlorhydrins. Also, inorganic/organic coagulant blends have been used. Flocculation aggregates or combines particles by bridging the space between particles with high molecular weight chemicals. Anionic polymers dissolve to possess negatively-charged ions and the reverse occurs with cationic flocculants. Polyampholytes, when dissolved in water, possess both positively- and negatively charged ions.

After chemical treatment, the treated water flows into sedimentation ponds so metal hydroxide precipitates in the water can settle. Dissolved metals precipitate from AMD as a loose, open-structured mass of tiny grains called "floc." Sufficient residence time, which is dictated by pond size and depth, is important for adequate metal precipitation. The amount of metal floc generated by AMD neutralization depends on the quality and quantity of water being treated which, in turn, determines how often the ponds must be cleaned. The most important physical property is a floc's settleability, which includes both the settling rate and final floc volume. Typically, calcium hydroxide and sodium carbonate produce a granular, dense floc versus a more gelatinous, loose floc generated by sodium hydroxide and ammonia. The chemical compositions of flocs are typically hydrated ferrous or ferric oxyhydroxides, gypsum, hydrated aluminum oxides, calcium carbonate, and bicarbonate, with trace amounts of silica, phosphate, manganese, copper, and zinc.

In some cases, mine pool water may already contain high levels of alkalinity in addition to heavy metals. In this situation, the pH of the drainage water is closer to neutral, on the order of 5 to 7, typically about 6.5. Drainage waters of this type also typically have hardness levels expressed as calcium carbonate in excess of 100, and alkalinity levels expressed as calcium carbonate in excess of 100. Generally, under the prevailing conditions, a significant amount of $CO_2$ is dissolved in the mine water. Iron levels are typically in excess of 0.5 ppm and predominately in the ferrous state. This type of drainage water is referred to herein as hard drainage water (HDW).

When HDW is exposed to typical AMD treatment schemes, the high pH exposure creates undesirable side effects. Typically, water that contains alkaline earth metal cations, such as calcium, barium, magnesium, etc., and several anions, such as bicarbonate, carbonate, sulfate, oxalate, phosphate, silicate, fluoride, etc., in combinations which exceed the solubility of their reaction products forms precipitates until these product solubility concentrations are no longer exceeded. For example, when the concentrations of calcium ion and carbonate ion exceed the solubility of the calcium carbonate reaction products, a solid phase of calcium carbonate will form.

Solubility product concentrations are exceeded for various reasons, such as partial evaporation of the water phase, an increase in pH, or temperature, and the introduction of additional ions, which form insoluble compounds with the ions already present in solution. For example, mine pool water that is pumped to the surface undergoes degassing of $CO_2$ followed by an increase in solution pH. The corresponding Langelier Saturation Index (LSI) shifts from a negative value (corrosive) to a positive value (scaling). LSI is often used by water treatment specialists to describe the scaling potential of a water for applications such as, for example, in cooling towers.

The Langelier Saturation index (LSI) is an equilibrium model derived from the theoretical concept of saturation and provides an indicator of the degree of saturation of water with respect to calcium carbonate. It can be shown that the Langelier saturation index (LSI) can be correlated to the base 10 logarithm of the calcite saturation level. The Langelier saturation level approaches the concept of saturation using pH as a main variable. The LSI can be interpreted as the pH change required to bring water to equilibrium.

Water with a LSI of +1.0 is one pH unit above saturation. Reducing the pH by 1 unit will bring the water into equilibrium. This occurs because the portion of alkalinity present as $CO_3^{2-}$ decreases as the pH decreases, according to the equilibriums describing the dissociation of carbonic acid:

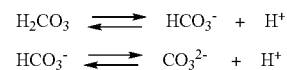

If the LSI is negative, there is little to no potential for scale to form; the water will typically dissolve $CaCO_3$. If the LSI is positive, scale will typically form and $CaCO_3$ precipitation typically will occur. If the LSI is close to zero, a borderline condition for scale potential arises. Changes in water quality, pH, and/or temperature, or evaporation could change the index, leading to scale formation. The LSI is a widely used indicator of cooling water scale potential. It is an equilibrium index and deals with the thermodynamic driving force for calcium carbonate scale formation and growth. It indicates the driving force for scale formation and growth in terms of pH as a master variable.

In order to calculate the LSI, it is necessary to know the alkalinity (mg/l as $CaCO_3$), the calcium hardness (mg/l $Ca^{2+}$ as $CaCO_3$), the total dissolved solids (mg/l TDS), the actual pH, and the temperature of the water (° C.). If TDS is unknown, but conductivity is, TDS as mg/l can be estimated. LSI is defined as:

$$LSI = pH - pH_s$$

Where:
pH is the measured water pH
$pH_s$ is the pH at saturation in calcite or calcium carbonate, and is defined as:

$$pH_s = (9.3 + A + B) - (C + D)$$

Where:
$A = (\text{Log}_{10} [TDS] - 1)/10$
$B = -13.12 \times \text{Log}_{10} (° C. + 273) + 34.55$
$C = \text{Log}_{10} [Ca^{2+} \text{ as } CaCO_3] - 0.4$
$D = \text{Log}_{10} [\text{alkalinity as } CaCO_3]$ More specifically, the LSI is an equilibrium model derived from the theoretical concept of saturation, and provides an indicator of the degree of saturation of calcium carbonate for a given set of conditions. Because LSI approaches the concept of saturation using pH as a main variable, the LSI can be interpreted as the pH change required to bring water to equilibrium.

HDW typically has a slight scale forming tendency, but when HDW is exposed to typical AMD treatments, the scale forming tendency may increase dramatically as indicated by a higher LSI. In this situation, hardness in the form of calcium and magnesium ions combines with anions, such as carbonate and sulfate, to form a solid. This solid material will form scale and may combine with other chemicals in the water. The higher the hardness, the greater the amount and the faster scale will form. As the various reaction products form, they adhere to surfaces contacting the water carrying system and create deposits of scale. Also, accumulation of scale may interfere with fluid flow, facilitates corrosive processes, and/or harbors bacteria. In creeks, streams, spillways, and other waterways, the unwanted deposits can interfere with the life cycle of aquatic life. The build-up of scale is an expensive problem, causing delays and shutdowns for cleaning and removal. For example, calcium sulfate scale can be particularly difficult to remove and may be particularly aggressive toward metal substrates.

Consequently, there is a demonstrated need in the art for a method of removing metal ions from HDW where the formation of detrimental scale forming salts is minimized or eliminated.

SUMMARY OF THE INVENTION

The present invention relates to a method of treating hard water mine drainage to remove unwanted metals, while preventing the formation of unwanted scale forming salt deposits. The method includes the step of adding a scale control agent to the mine drainage water and, optionally, adding an oxidizing agent to the mine drainage water and/or precipitating and settling the metals in their hydroxide form from the water. The discharged water contains a reduced concentration of transition metals and possesses a reduced potential for scale deposition. The treated water may be safely returned to the environment.

DESCRIPTION OF THE PREFERRED EMBODIMENTS

Unless otherwise indicated, all numbers or expressions referring to quantities of ingredients, reaction conditions, etc. used herein are to be understood as modified in all instances by the term "about."

Various numerical ranges are disclosed in this patent application. Because these ranges are continuous, they include every value between the minimum and maximum values. Unless expressly indicated otherwise, the various numerical ranges specified in this application are approximations.

As used herein and in the claims, the terms "mine" and "mining" refer to active, inactive or abandoned extraction and/or excavation operations for removing minerals, metals, ores and/or coal from the earth. Non-limiting examples of minerals, metals and ores include limestone, talc, kaolin, calcium carbonate, copper, bauxite, gold, silver, iron and iron ore. A particular embodiment of the present invention is directed to a method of treating hard water mine drainage emanating from an active, inactive or abandoned coal mine or coal refuse pile, non-limiting examples of which include underground deep coal mines that may or may not have stopped producing coal and surface coal mines.

As used herein and in the claims, the term "scale" refers to the various crystal forms of hard water salts that may settle out as a deposit on surfaces contacted by water containing hard water salts. "Hard water salts" include, but are not limited to, calcium, magnesium, and iron salts of carbonate, sulfate, silicate, oxalate, and oxides that may become insoluble and form deposits on contacted surfaces. Calcium carbonate is the most typically encountered scale forming hard water salt, but is often encountered in combination with one or more of the hard water salts identified above.

The present invention is directed to a method of treating water drainage from mines, coal refuse piles, and other such locations where rock formations have been disturbed, exposed to water sources, such as rainfall, surface water, and subsurface water sources, such that the water contains metals in solution or suspension. Typically, the water treated by the present method includes a pH of from 4.5 to 10, often 5 to 8.5 and typically 6 to 8.5; calcium hardness greater than 100 mg/l, often greater than 150 mg/l, and typically greater than 200 mg/l of $Ca^{+2}$ as calcium carbonate; alkalinity greater than 100 mg/l, often greater than 200 mg/l, and typically greater than 300 mg/l as calcium carbonate; and greater than 0.5 mg/l, often greater than 2 mg/l, typically greater than 5 mg/l and in some cases greater than 25 mg/l of one or more metal ions or salts of an iron, copper, zinc, lead, mercury, cadmium, arsenic, barium, selenium, silver, chromium, aluminum, manganese, nickel, cobalt, uranium, and antimony. In many cases, prior to final discharge, the water has a positive LSI, which indicates a potential to form scale. This water is referred to herein as hard drainage water (HDW).

In all cases, HDW entering treatment may not initially have a positive LSI. However, a positive LSI is typically acquired during treatment or processing due to, as a non-limiting example, the degassing of carbon dioxide, which typically leads to an increase in pH. The higher pH typically results in a higher driving force for scaling as described above. The present invention is aimed at preventing increases in the driving force for scale and/or controlling the deposition of scale under scaling conditions.

Hardness is a measure of polyvalent cations (ions with a charge greater than +1) in water. Calcium hardness generally represents the concentration of calcium ($Ca^{+2}$) and magnesium ($Mg^{+2}$) ions, because these are the most common polyvalent cations. Other ions, such as iron ($Fe^{+2}$) and manganese ($Mn^{+2}$), may also contribute to the hardness of water, but are generally present in much lower concentrations. Hardness is generally expressed in units of milligrams per liter (mg/l) or parts per million (ppm) of $CaCO_3$ (calcium carbonate). Total alkalinity is the total concentration of bases in water expressed as parts per million (ppm) or milligrams per liter (mg/l) of calcium carbonate ($CaCO_3$).

As was mentioned above, the LSI of the HDW may be positive, which indicates a potential for precipitation and the formation of scale deposits. As a non-limiting example, when the HDW has a pH of 8, a temperature of 10° C., TDS of 500 mg/l, calcium hardness of 200 as mg/l as $CaCO_3$, and calcium alkalinity of 150 mg/l as. $CaCO_3$, the LSI is +0.2. If the pH of the water is increased to 8.5, the LSI is +0.7. If the temperature of the water is increased to 20° C., the LSI is +0.4. If the calcium hardness is increased to 400 mg/l as $CaCO_3$, the LSI is +0.5. If the total alkalinity is increased to 600 mg/l as $CaCO_3$, the LSI is +0.8. So it can be seen that various changes in the HDW can increase its tendency to leave scale deposits.

In the present method for treating mine drainage, the HDW is collected from its source. This water may be blended with AMD to reduce the alkalinity, or to provide an additional source of metal ions for precipitation. However, acid water is typically only available in limited quantities, making consistent blending operations difficult due to the quantity and varying composition of the acid water. The collected water may be aerated. As used herein and in the claims, the term "aerated" refers to natural or mechanical methods of mixing air and water. Any suitable mechanical aeration device may be used in the present invention. Suitable aeration devices are described, for example, in U.S. Pat. No. 3,142,639 to Baer et al. and U.S. Pat. No. 4,695,378 to Ackman et al., which are herein incorporated by reference.

A suitable oxidizing agent is added to either the HDW or to the blended water to oxidize the metals. As used herein and in the claims, the term "oxidizing agent" refers to a substance that may bring about oxidation in another substance. As a non-limiting example, iron is oxidized from the $Fe^{+2}$ form to the $Fe^{+3}$ form. Any suitable oxidizing agent may be used in the present invention. Suitable oxidizing agents include, but are not limited to, peroxides, such as hydrogen peroxide, calcium peroxides, and benzoyl peroxide; hypochlorites, such as sodium hypochlorite and calcium hypochlorite; permanganate; percarbonates; perborates; perchlorates; chromates; ozone; osmium tetroxide; sodium metaperiodate; nitric acid; nitrous acid; and persulfates.

In an embodiment of the present invention, hydrogen peroxide is used as the suitable oxidizing agent. Hydrogen peroxide may be advantageous in situations where addition of salt is to be avoided, because the byproduct of hydrogen peroxide use is water, and no salts are added to the process stream.

The suitable oxidizing agent is added to the HDW or to the blended water at a level sufficient to oxidize the metal ions to their higher oxidation state, which is typically more easily precipitated and removed from the HDW. As a non-limiting example, the suitable oxidizing agent may be added to the HDW at a level of at least 0.01 mg/l, often at least 0.5 mg/l, typically at least 5 mg/l, and in some cases at least 20 mg/l. The suitable oxidizing agent may be added to the HDW at a level of up to 500 mg/l, often up to 200 mg/l, in some cases up to 100 mg/l, typically up to 50 mg/l, and in some cases up to 10 mg/l. The oxidizing agent may be added to the HDW at or above or between any of the values recited herein. When used, the oxidizing agent may be added before, during, or after the mechanical aeration of the collected water.

In an embodiment of the present invention, the oxidizing agents are peroxides selected from hydrogen peroxide and calcium peroxide, and permanganates selected from sodium permanganate and potassium permanganate, and the peroxides and permanganates are applied sequentially or in combination to the mine drainage water.

When the mine drainage water includes $H_2S$, significant odor problems are encountered. Such mine drainage water may contain at least 0.01 mg/l, in some cases at least 0.1 mg/l and in other cases at least 0.5 mg/l of $H_2S$ and as much as 500 mg/l and in some situations up to 100 mg/l $H_2S$. The addition of a suitable oxidizing agent in the amounts described above to such mine drainage water effectively deodorizes the mine drainage water by converting the $H_2S$ to sulfate, eliminating the source of the odor.

After addition of the oxidizing agent and/or the aeration step, the pH of the HDW is typically from 6 to 8.5. The oxygenated HDW or blended water is transferred to a settling tank or pond. At this point, or during the transfer to the settling tank or pond, a coagulant and/or a flocculating agent may be added to the water. The settling tank or pond provides for precipitation and settling of the metals in the water, typically in their hydroxide form.

Any suitable coagulating agent may be used in the present invention. As used herein and in the claims, the term "coagulating agent" refers to a substance that brings together or causes the bringing together of colloidal particles in a liquid to form larger masses. Suitable coagulating agents include, but are not limited to, inorganic coagulants, such as alum, aluminum chloride, polyaluminum chloride, aluminum chlorohydrate, ferric chloride and ferric sulfate; and organic coagulants, such as cationic polymers, such as homopolymers and copolymers of diallyl dimethyl ammonium chloride, polyamines, and quaternized polyepichlorhydrins. Various inorganic and organic coagulants and combinations thereof may be used in the present invention. Suitable inorganic, organic, and combination coagulants that may be used in the present invention are disclosed, for example, in U.S. Pat. Nos. 6,184,257 and 5,035,808 to Hassick et al., which are herein incorporated by reference. When used, coagulants are added to the water at a level of from 0.1 to 100 mg/l, in some situations from 0.01 to 100 mg/l, in some instances 0.1 to 50 mg/l, often from 0.5 to 20 mg/l, and typically from 1 to 10 mg/l.

Any suitable flocculating agent may be used in the present invention. As used herein and in the claims, the term "flocculating agent" refers to a substance that brings colloidal aggregates in a liquid together into larger clumps or masses that may precipitate or settle from the liquid. Suitable flocculating agents include synthetic flocculating agents and natural flocculating agents. Synthetic flocculating agents include, but are not limited to, polyethyleneoxides and polyacrylamides, including non-ionic, anionic, and cationic polyacrylamides. Natural flocculating agents include, but are not limited to, cellulosics, such as methyl cellulose, ethyl cellulose, and carboxymethyl cellulose; starches, such as non-ionic starches, anionic starches, and cationic starches; guar; and Irish moss. When used, flocculating agents are added to the water at a level of from 0.1 to 100 mg/l, in some instances 0.01 to 50 mg/l, often from 0.5 to 20 mg/l, and typically from 1 to 10 mg/l.

In some instances, it is advantageous to add a suitable alkalinity agent to raise the pH of the mine drainage water prior to precipitating and settling the metals in their hydroxide form. Suitable alkalinity agents include, but are not limited to, caustic soda, soda ash, ammonia, and lime. In many instances, lime is typically used.

The treated water is allowed to stay in the settling tank or pond for a sufficient time for the coagulated and/or flocculated metals to settle from the continuous phase. The length of time in the settling tank or pond is referred to as residence time. The residence time may be from 5 minutes to 120 days, often from 10 minutes to 24 hours, typically from 15 minutes to 24 hours, and in some cases, from 24 hours to 120 days. The resulting water is referred to as clarified water.

In order to prevent the precipitation of scale forming salts from the hard drainage or blended water, a suitable scale control agent is added to the clarified portion of the water. As used herein and in the claims, the term "scale control agent" refers to a substance that prevents formation of hard water scale, inhibits or prevents the growth of hard water salt crystals, solubilizes solid forms of hard water salts and/or renders solid forms of hard water salts non-adherent, such that they are unable to attach or adhere to surfaces. Suitable scale control agents include, but are not limited to, compounds selected from water-soluble polycarboxylates, phosphonates, organic phosphates, organic polyphosphates, metal salts, and sulfonates. Suitable polymeric scale control agents include, but are not limited to, homopolymers and copolymers of one or more of acrylic acid, methacrylic acid, maleic acid, acrylamide, 2-acrylamide-methyl propane sulfonic acid (AMPSA), ethoxylated methacrylate, itaconic acid, polyethylene glycol monomethacrylate, t-butyl acrylamide, sodium styrene sulfonate, sodium vinyl sulfonate, hydroxy propyl acrylate, hydroxy propyl methacrylate, 3-allyloxy-2-hydroxy propane sulfonic acid, vinyl phosphonic acid and their corresponding salts. Non-limiting examples of suitable scale control agents include, but are not limited to, 1-hydroxy ethylidene 1,1-diphosphonic acid (HEDP), amino tri(methylene phosphonic acid) (AMP), orthophosphate, polyphosphates, polyether polyamino methylene phosphonates, such as those disclosed in U.S. Pat. No. 5,358,642 to Chen et al., herein incorporated by reference, and N,N-bis (phosphonomethyl)-2-amino-1-propanol as disclosed in U.S. Pat. No. 5,259,974 to Chen et al., herein incorporated by reference, poly(acrylic acid), hydrolyzed poly(maleic anhydride), a copolymer including acrylic acid and AMPSA, sulfonated polyphosphino carboxylic acid (commercially available as Belclene® 400 from FMC Technologies, Chalfont, Pa.), phosphonocarboxylic acid (sulfonated) copolymer(commercially available as Belclene® 494 from FMC Technologies), acrylic acid-sulfophenylmethallyl ether copolymer commercially available from Alco Chemical, Chattanooga, Tenn. as Aquatreat® AR-540), maleric anhydride-ethyl acrylate-vinyl acetate copolymer(commercially available as Belclene® 283 from FMC Technologies), 2-phosphonobutane-1,2,4-tricarboxylic acid, 1 hydroxy ethylidene 1,1-diphosphonic acid, amino tri(methylene phosphonic acid), orthophosphate, polyphosphates, polyether polyamino methylene phosphonates, N,N-bis(phosphonomethyl)-2-amino-1-propanol and their corresponding salts.

As used herein and in the claims, the term "corresponding salt" refers to an acid functional material in its ionized or anionic form together with a counter ion. As a non-limiting example, an acid functional material will be anionic in its ionized form and will typically have an alkali metal cation or an ammonium compound as a counter ion. Such counter ions may include, but are not limited to $Li^+$, $Na^+$, $K^+$, $Rb^+$, $Cs^+$ and $N^+R_4$, where each R group is independently selected from H and $C_1$–$C_{12}$ linear or branched alkyl, alkenyl, aryl, alkaryl and aralkyl groups. Typically, the counter ion is one or more of $Na^+$, $K^+$ and ammonium.

Any suitable combination of scale control agents may be used in the present invention. Scale control agents that have a low toxicity toward marine life are particularly suitable, for example scale control agents having a 96-hour $LC_{50}$ for rainbow trout of greater than 50 mg/l.

The suitable scale control agent is added to the clarified water at a level sufficient to prevent the formation, precipitation, and/or deposition of scale forming salts as described above. As a non-limiting example, the suitable scale control agent may be added to the clarified water at a level of at least 0.01 mg/l, often at least 0.05 mg/l, typically at least 0.1 mg/l, and in some cases at least 0.5 mg/l. The suitable scale control agent may be added to the clarified water at a level of up to 100 mg/l, often up to 20 mg/l, typically up to 15 mg/l, and in some cases, up to 10 mg/l. The suitable scale control agent may be added to the clarified water at any level ranging between those values recited herein.

After treatment, the water may be returned to the environment by way of a suitable waterway. Non-limiting examples of suitable waterways include spillways, rivers, streams, lakes, and the like. As used herein and in the claims, the term "spillway" refers to a waterway beginning at a point of discharge from a final settling pond at a water treatment site and ending where the water in the waterway enters a naturally occurring waterway through gravity flow. Typically, spillways are laden with rock and produce turbulent flow in the water therein, causing aeration of the water and degassing of carbon dioxide from the water, causing the pH of the spillway water to increase. The pH increase often leads to scale deposition in the spillway.

The present method of treating mine drainage is advantageous in that hard water scale formation does not occur, but also because fewer and less hazardous chemicals are stored and used to treat the mine drainage. In the present method, neutralization of the drainage water is not essential, so concentrated acids, such as hydrochloric acid and sulfuric acid, are not used, nor are concentrated bases, such as sodium hydroxide or potassium hydroxide, required. The elimination of these materials allows for less chemical storage on site, eliminates the handling of such hazardous materials, and eliminates the formation of inorganic salts, which would otherwise be discharged with the treated mine drainage water.

In a presently preferred embodiment of the present invention, the following steps for treating mine drainage are included. (1) A hard drainage water with a pH greater than 5.5, calcium hardness greater than 100 mg/l as calcium carbonate, alkalinity greater than 100 mg/l as calcium carbonate and greater than 0.5 mg/l iron (as a combination of ferric and ferrous iron ions) is collected from a source. (2) Hydrogen peroxide is added to the hard drainage water at an active level of from 0.1 mg/l to 500 mg/l. (3) The hard drainage water is optionally blended with an AMD water and collected. (4) The collected water is aerated (primarily to provide mixing and remove carbon dioxide). (5) The aerated/oxygenated collected water is transferred to a suitable settling basin or pond. (6) While transferring the aerated/oxygenated collected water, an anionic polyacrylamide flocculant is added to the collected water. (7) In the settling basin or pond, the precipitated iron, other precipitated metal ions, and metal ion salts are allowed to settle, providing a clarified water. (8) To the clarified water, a suitable scale control agent that includes one or more of a poly(acrylic acid), hydrolyzed poly(maleic anhydride), a copolymer comprising acrylic acid and 2-acrylamide-methyl propane sulfonic acid, sulfonated polyphosphino carboxylic acid, phosphonocarboxylic acid (sulfonated) copolymer, acrylic acid-sulfophenylmethallyl ether copolymer, maleric anhydride-ethyl acrylate-vinyl acetate copolymer, 2-phosphonobutane-1,2,4-tricarboxylic acid, 1-hydroxy ethylidene 1,1-diphosphonic acid, amino tri(methylene phosphonic acid), orthophosphate, polyphosphates, polyether polyamino umethylene phosphonates, and N,N-bis (phosphonomethyl)-2-amino-1-propanol is added to the clarified water at an active level of from 0.01 mg/l to 100 mg/l. The water is then discharged to a natural waterway.

In another embodiment of the present invention, mine drainage water is treated by (a) providing mine drainage water having a pH of from 4.5 to 10; calcium hardness greater than 100 mg/l of $Ca^{+2}$ as calcium carbonate; alkalinity greater than 100 mg/l as calcium carbonate; and greater than 0.5 mg/l of one or more metal ions or metal salts selected from the group consisting of iron, copper, zinc, lead, mercury, cadmium, arsenic, barium, selenium, silver, chromium, aluminum, manganese, nickel, cobalt, uranium, and antimony; (b) adding an oxidizing agent, as described above, to the mine drainage water; and (c) adding a scale control agent, as described above, to the mine drainage water. The treatment method may further include a step of precipitating and settling the metals in their hydroxide form, as described above.

In a further embodiment of the present invention, mine drainage water is treated by (a) providing mine drainage water having a pH of from 4.5 to 10; calcium hardness greater than 100 mg/l of $Ca^{+2}$ as calcium carbonate; alkalinity greater than 100 mg/l as calcium carbonate; and greater than 0.5 mg/l of one or more metal ions or metal salts selected from the group consisting of iron, copper, zinc, lead, mercury, cadmium, arsenic, barium, selenium, silver, chromium, aluminum, manganese, nickel, cobalt, uranium, and antimony; and (b) adding a scale control agent, as described above, to the mine drainage water. The treatment method may optionally include the steps of adding an oxidizing agent to the mine drainage water, as described above, and/or the step of precipitating and settling the metals in their hydroxide form, as described above, and/or the step of adding an alkalinity agent to raise the pH of the mine drainage water, as described above, prior to precipitating and settling the metals in their hydroxide form.

The present invention is more particularly described in the following examples, which are intended to be illustrative only, since numerous modifications and variations therein will be apparent to those skilled in the art. Unless otherwise specified, all parts and percentages are by weight.

EXAMPLE 1

This example demonstrates the use of the present invention in a typical mine drainage water treatment operation including an aeration tank, settling pond, and discharge point.

In an abandoned coal mine operation, mine drainage water having a pH of 6.85, alkalinity of 460 ppm as $CaCO_3$, calcium hardness of 340 ppm as $CaCO_3$, 26.2 ppm iron (16.1 ppm as $Fe^{+2}$) and LSI of −0.2 was fed to an aeration tank. The water was aerated and the water leaving the aeration tank had a pH of 7.10, alkalinity of 540 ppm as $CaCO_3$, calcium hardness of 290 ppm as $CaCO_3$, 19.2 ppm iron (12 ppm as $Fe^{+2}$) and LSI of 0.0 was treated with lime and pumped uphill to a settling pond. The water, after discharge from the settling pond, but prior to combining with a natural occurring waterway, had a pH of 8.45, alkalinity of 380 ppm as $CaCO_3$, calcium hardness of 210 ppm as $CaCO_3$, 0.4 ppm iron (0 ppm as $Fe^{+2}$) and LSI of +1.1. Fizz tests indicated the presence of scale deposits after discharge from the settling pond. The "fizz test" is performed by adding dilute hydrochloric acid to the surface of rocks to test for scale deposits. If calcium carbonate is present, the calcium carbonate will decompose to liberate carbon dioxide and bubbles or "fizz." A positive fizz test result indicated the presence of scale. Additionally, after one month of operation, the uphill feed pipe connecting the aeration tank to the settling pond was substantially blocked by scale deposits, requiring shut down of operations and an extensive clean out of the uphill feed pipe.

The same mine drainage water was aerated and treated with 6 ppm on an active basis of hydrogen peroxide solution. The water leaving the aeration tank had a pH of 7.10, alkalinity of 540 ppm as $CaCO_3$, calcium hardness of 290 ppm as $CaCO_3$, 19.2 ppm iron (0 ppm as $Fe^{+2}$) and LSI of 0.0. The water was not treated with lime and was pumped uphill to the settling pond. Prior to the settling pond, 2 ppm of an anionic flocculant, KR-F2314, available from Kroff Chemical Company, Inc., Pittsburgh, Pa., was added to the water to enhance removal of metal hydroxide precipitates that had formed. The water leaving the settling pond had a pH of 8.5, alkalinity of 400 ppm as $CaCO_3$, calcium hardness of 220 ppm as $CaCO_3$, 0.4 ppm iron (0 ppm as $Fe^{+2}$) and LSI of +1.2. After one month of operation, the uphill feed pipe connecting the aeration tank to the settling pond was substantially free of scale deposits and was fully operational. Fizz tests indicated the presence of scale deposits after discharge from the settling pond.

EXAMPLE 2

This example demonstrates the use of the present invention in a typical mine drainage water treatment operation including an aeration tank, settling pond, and discharge point.

In an abandoned coal mine operation, mine drainage water having a pH of 6.95, alkalinity of 530 ppm as $CaCO_3$, calcium hardness of 1008 ppm as $CaCO_3$, 111 ppm iron and LSI of +0.4 was fed to an aeration tank. The water was treated with lime, mechanically aerated, and allowed to flow to a settling pond. The water discharged from the pond, prior to combining with a natural occurring waterway, traveled about 400 feet down a spillway, where a sample point was located. The water at the sample point had a pH of 8.27, alkalinity of 360 ppm as $CaCO_3$, calcium hardness of 950 ppm as $CaO_3$, 0.16ppm iron and LSI of +1.5. Fizz tests performed on rocks at the sample point indicated the presence of scale deposition.

The same mine drainage water was aerated and treated with lime and flowed to the settling pond. The discharge from the settling pond was treated with 6 ppm scale control agent containing HEDP on an active basis. The water at the sample point had a pH of 8.72, alkalinity of 302 ppm as $CaCO_3$, calcium hardness of 930 ppm as $CaO_3$, 0.49 ppm iron (0 ppm $Fe^{+2}$) and LSI of +1.9. Fizz tests performed on rocks at the sample point did not indicate the presence of scale deposition.

This example demonstrates that when a scale control agent is used as described in the present method, the scaling potential of HDW is reduced significantly and that substantially no scale formation is observed.

EXAMPLE 3

This example demonstrates the use of the present invention in a typical mine drainage water treatment operation including an aeration tank, settling pond, and discharge point.

In an abandoned coal mine operation, mine drainage water having a pH of 6.70, alkalinity of 597 ppm as $CaCO_3$, calcium hardness of 402 ppm as $CaCO_3$, 12.2 ppm iron and LSI of −0.1 was fed to an aeration tank, treated with caustic soda to raise the pH and mechanically aerated. An anionic flocculant, KR-0883 available from Kroff Chemical, was added at 1 ppm on an active basis to the aerated water and allowed to flow through a flocculating chamber, followed by a series of settling ponds. Upon exiting the settling ponds, the pH of the clarified water was adjusted to a pH of 7.1 with HCl. The water went through a final polishing pond, then along a rock-laden spillway prior to discharge in a local river. A sampling point with test rocks was established in the spillway approximately one hundred yards from the river. The water at the sample point had a pH of 7.7, alkalinity of 392 ppm as $CaCO_3$, calcium hardness of 388 ppm as $CaCO_3$, 0.5ppm iron and LSI of +0.7. Fizz tests performed on the test rocks at the sample point indicated the presence of scale deposition.

The same mine drainage water was treated with 10 ppm hydrogen peroxide on an active basis, aerated and treated with 1 ppm KR-0883 as indicated above. The discharge from the polishing pond was treated with 10 ppm of a scale control agent containing HEDP. The water at the sample point had a pH of 8.12, alkalinity of 332 ppm as $CaCO_3$, calcium hardness of 392 ppm as $CaCO_3$, 0.30 ppm iron and LSI of +1.0. Fizz tests performed on the test rocks at the sample point did not indicate the presence of scale deposition.

The example demonstrates that the use of the present method of applying an oxidizing agent, a coagulating and/or a flocculating agent, and a scale control agent reduces the scaling potential of HDW to the point that substantially no scale formation is observed.

The present invention has been described with reference to specific details of particular embodiments thereof. It is not intended that such details be regarded as limitations upon the scope of the invention except insofar as and to the extent that they are included in the accompanying claims.

I claim:

1. A method for inhibiting precipitation of calcium salt and metal oxide and/or metal hydroxide from hard mine drainage water comprising:
   (a) providing hard mine drainage water having a pH of from 4.5 to 10; calcium hardness greater than 100 mg/l of $Ca^{+2}$ as calcium carbonate; alkalinity greater than 100 mg/l as calcium carbonate; and one or more metal ions or metal salts selected from the group consisting of iron, copper, zinc, lead, mercury, cadmium, arsenic, barium, selenium, silver, chromium, aluminum, manganese, nickel, cobalt, uranium, and antimony; and
   (b) adding a scale control agent to the mine drainage water, wherein the scale control agent is one or more selected from the group consisting of polymeric scale control agents, water-soluble polycarboxylates, phosphonates, organic phosphates, organic polyphosphates, and sulfonates, at a level sufficient to inhibit precipitation of calcium salt and metal oxide and/or metal hydroxide in said hard mine drainage water.

2. The method of claim 1, further comprising the step of adding an oxidizing agent to the mine drainage water.

3. The method of claim 2, wherein the oxidizing agent is one or more selected from the group consisting of peroxides, hypochlorites, permanganates, percarbonates, perborates, perchlorates, chromates, ozone, osmium tetroxide, sodium metaperiodate, nitric acid, nitrous acid, and persulfates.

4. The method of claim 3, wherein the oxidizing agents are peroxides selected from hydrogen peroxide and calcium peroxide, and permanganates selected from sodium permanganate and potassium permanganate, wherein the peroxides and permanganates are applied sequentially or in combination to the mine drainage water.

5. The method of claim 2, wherein the oxidizing agent is added to the drainage water at a level of 0.1 mg/l to 500 mg/l.

6. The method of claim 1, further comprising the step of precipitating and settling the metals in their hydroxide form.

7. The method of claim 6, further comprising the step of adding an alkalinity agent to raise the pH of the mine drainage water, prior to precipitating and settling the metals in their hydroxide form.

8. The method of claim 7, wherein the alkalinity agent is one or more selected from the group consisting of caustic soda, soda ash, ammonia, and lime.

9. The method of claim 7, wherein the alkalinity agent is lime.

10. The method of claim 6, including the step of adding one or more of a coagulating agent and a flocculent to the drainage.

11. The method of claim 10, wherein the coagulating agent is one or more selected from the group consisting of inorganic coagulants, organic coagulants, and inorganic/organic coagulant blends.

12. The method of claim 11, wherein the inorganic coagulants are one or more selected from the group consisting of alum, aluminum chloride, polyaluminum chloride, aluminum chlorohydrate, ferric chloride, and ferric sulfate.

13. The method of claim 11, wherein the organic coagulants are one or more selected from the group consisting of poly(diallyl dimethyl ammonium chloride), copolymers of diallyl dimethyl ammonium chloride, polyamines, and quaternized polyepichlorhydrins.

14. The method of claim 10, wherein the coagulating agent is added to the drainage water at a level of from 0.1 to 100 mg/l.

15. The method of claim 10, wherein the flocculent is one or more selected from the group consisting of polyethyleneoxides, non-ionic polyacrylamides, anionic polyacrylamides, cationic polyacrylamides, methyl cellulose, ethyl cellulose, carboxymethyl cellulose, non-ionic starches, anionic starches, cationic starches, guar, and Irish moss.

16. The method of claim 10, wherein the flocculant is added to the drainage water at a level of from 0.01 to 100 mg/l.

17. The method of claim 1, wherein the scale control agent has low toxicity toward marine life.

18. The method of claim 1, wherein the polymeric scale control agents are one or more selected from homopolymers and copolymers of one or more monomers selected from the group consisting of acrylic acid, methacrylic acid, maleic acid, acrylamide, 2-acrylamide-methyl propane sulfonic acid, ethoxylated methacrylate, itaconic acid, polyethylene glycol monomethacrylate, t-butyl acrylamide, sodium styrene sulfonate, sodium vinyl sulfonate, hydroxy propyl acrylate, hydroxy propyl methacrylate, 3-allyloxy-2-hydroxy propane sulfonic acid, vinyl phosphonic acid and their corresponding salts.

19. The method of claim 1, wherein the scale control agent is one or more selected from the group consisting of poly(acrylic acid), hydrolyzed poly(maleic anhydride), a copolymer comprising acrylic acid and 2-acrylamide-methyl propane sulfonic acid, sulfonated polyphosphino carboxylic acid, phosphonocarboxylic acid (sulfonated) copolymer, acrylic acid-sulfophenylmethallyl ether copolymer, maleric anhydride-ethyl acrylate-vinyl acetate copolymer, 2-phosphonobutane-1,2,4-tricarboxylic acid, 1-hydroxy ethylidene 1,1-diphosphonic acid, amino tri(methylene phosphonic acid), orthophosphate, polyphosphates, polyether polyamino methylene phosphonates, N,N-bis(phosphonomethyl)-2-amino-1-propanol and their corresponding salts.

20. The method of claim 1, wherein the scale control agent is added to the water at a level of from 0.01 mg/l to 100 mg/l.

21. The method of claim 1, wherein the mine drainage water has greater than 0.5 mg/l of one or more metal ions or metal salts selected from the group consisting of iron, copper, zinc, lead, mercury, cadmium, arsenic, barium, selenium, silver, chromium, aluminum, manganese, nickel, cobalt, uranium, and antimony.

22. The method of claim 1, wherein the calcium salt is selected from the group consisting of calcium carbonate, calcium sulfate and mixtures thereof.

23. The method of claim 22, wherein the calcium salt is calcium carbonate.

24. The method of claim 1, wherein the metal oxide is iron oxide.

25. The method of claim 1, wherein the metal hydroxide is iron hydroxide.

* * * * *

UNITED STATES PATENT AND TRADEMARK OFFICE
CERTIFICATE OF CORRECTION

PATENT NO. : 7,115,201 B2
APPLICATION NO. : 11/074023
DATED : October 3, 2006
INVENTOR(S) : Paul Rey It is certified that error appears in the above-identified patent and that said Letters Patent is hereby corrected as shown below:

<u>Title Page</u>, Item (56) References Cited, OTHER PUBLICATIONS, delete Reference No. 13 to NALCO which is a duplicate of No. 12 and insert therefor:

-- PAUL F. RICHARDSON, "Dispersants in Mineral Processing Applications", Presentation at American Institute of Mining Engineers Annual Meeting, 1978 --

Signed and Sealed this

Thirteenth Day of March, 2007

JON W. DUDAS
*Director of the United States Patent and Trademark Office*